(No Model.) 2 Sheets—Sheet 2.
W. P. TARRANT.
SLEIGH RUNNER ATTACHMENT FOR BABY CARRIAGES.
No. 493,416. Patented Mar. 14, 1893.
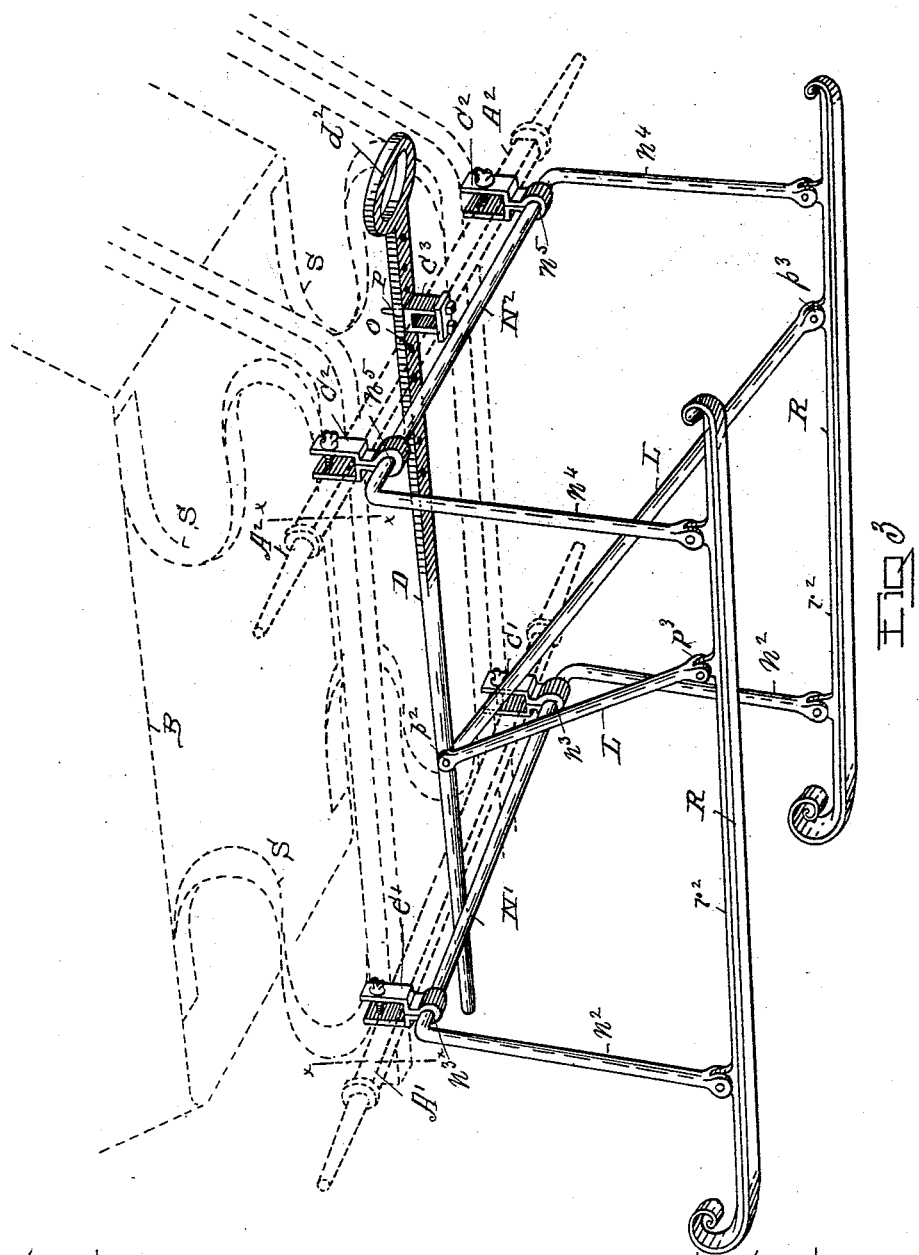
WITNESSES
Charles S. Brintnall
William A. Suret
INVENTOR
William P. Tarrant
by W. E. Hagan atty

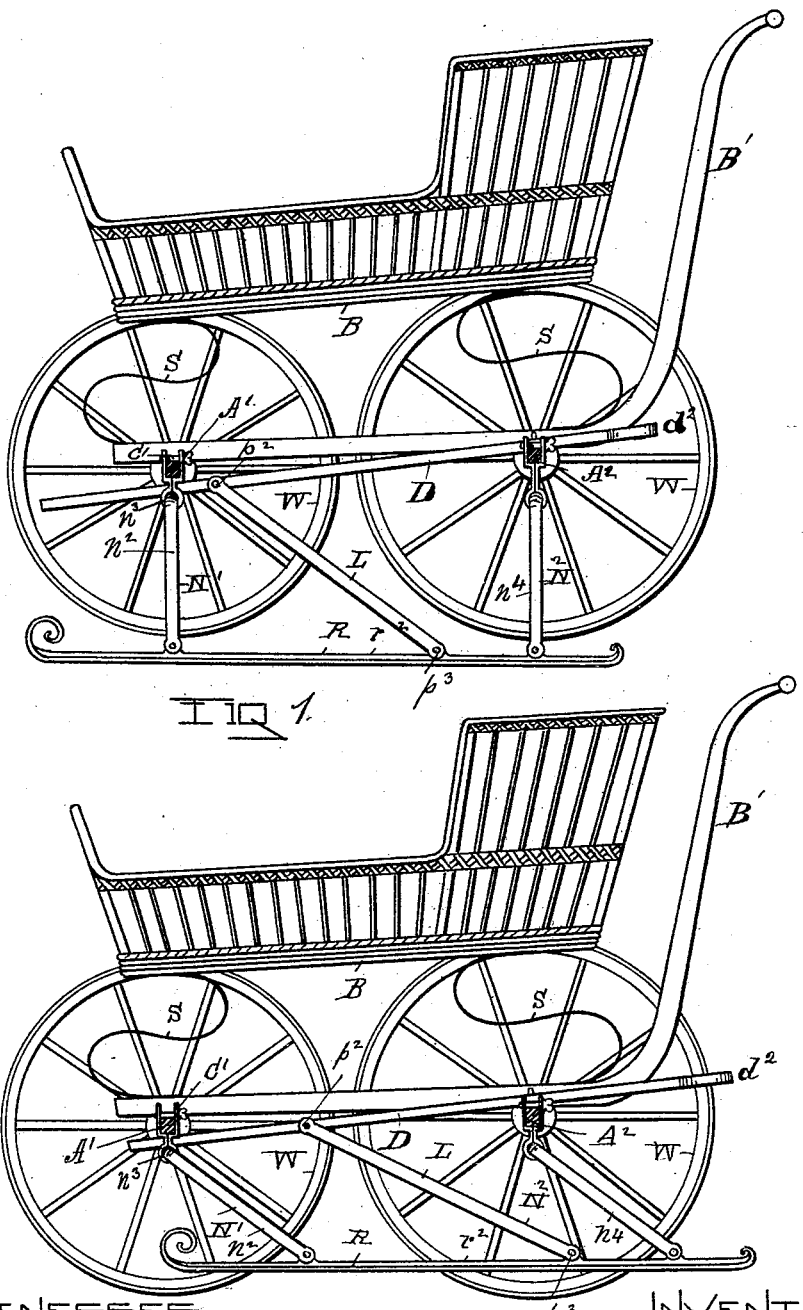

UNITED STATES PATENT OFFICE.

WILLIAM P. TARRANT, OF SARATOGA SPRINGS, NEW YORK, ASSIGNOR OF ONE-HALF TO THEODORE C. SCHALLEHN, OF SAME PLACE.

SLEIGH-RUNNER ATTACHMENT FOR BABY-CARRIAGES.

SPECIFICATION forming part of Letters Patent No. 493,416, dated March 14, 1893.

Application filed April 2, 1892. Serial No. 427,452. (No model.)

*To all whom it may concern:*

Be it known that I, WILLIAM P. TARRANT, of Saratoga Springs, Saratoga county, State of New York, have invented a new and useful Sleigh-Runner Attachment for Baby-Carriages, of which the following is a specification.

My invention relates to improvements upon that class of baby-carriages that are adapted by construction to run upon wheels, or sleigh runners, so that they may be used as sleighs in winter when there is snow upon the ground, or by raising the runners from off the latter to run on wheels; and my improvements more particularly relate to a construction of the parts by which the runners connect with the baby-carriage and are operated to rest on the ground so as to raise the wheels from off the latter when it is desired to use the carriage as a sleigh in winter or to raise the runners so that the wheels will bear on the ground, as will be more fully detailed hereinafter in connection with the illustration of the parts and detailed in the claims.

Accompanying this specification to form a part of it there are two plates of drawings containing three figures illustrating my invention with the same designation of parts by letter reference used in all of them.

Of these illustrations Figure 1, is a section taken from front to rear through the front and rear axle on the lines $x$, $x$, of Fig. 3: showing in side elevation the wheels upon one side of the vehicle, the body of the latter, and the sleigh-runner attachment, with the latter as resting upon the ground beneath the wheels. Fig. 2, shows the same parts that are shown in Fig. 1, with the same representation with the exception that the runners are shown as raised from the ground with the vehicle supported upon the wheels. Fig. 3, is a perspective of my sleigh-runner attachment with the carriage part with which it connects indicated by dotted lines and the wheels removed.

The several parts of the apparatus thus illustrated are designated by letter reference, and the function of the parts is described as follows.

The letters B, designate the baby-carriage body, S, its springs A', its front axle, A², its rear axle W, its wheels, and B', its push-bar all of which parts are of the usual and ordinary construction.

The letters R, R, designate two sleigh-runners one of which is arranged at each side of the vehicle. These runners are each made with a rib $r^2$, that is centrally projected upwardly from the tops of the runners which rib serves to stiffen them and permits the making of the runners lighter in weight.

The letter N', designates the front yoke, having the down-cast arms $n^2$, $n^2$, and this yoke has a hinging eye $n^3$, formed on the lower side of each of the clips C', with the latter attached to the front axle A'.

The letter $N^2$, designates the rear yoke which is made with down-cast arms $n^4$, $n^4$, and this yoke $n^2$, has a hinging eye $n^5$, formed on the under side of each of the clips C², C², each of which latter is attached to the rear axle A². The down cast arms $n^2$, and $n^4$, of each of the said yokes is pivotally attached to one of the runners R, at each side of the vehicle so that the runners by this connection with the arms of the yokes and the hinging connection the yokes make with the axle clips may be moved to swing back and forth beneath the vehicle body.

The letter D, designates a draw-bar which is constructed with a handle $d^2$, at its rear end, and it is arranged to pass frontwardly over the rear axle A², and under the front axle A', so that at its front end it will be between the latter, and the top of the yoke N'. This draw-bar has at its rear end the vertically made holes O, and the letter C³, designates a clip that is connected to the rear axle and which clip is constructed at its upper end with the holding pin P, adapted to enter any one of the holes O in the draw-bar.

The letters L, L, designate link-bars each of which at its upper end is pivotally connected at $p^2$, with the side of the draw-bar oppositely; and from where thus connected to the draw-bar these link-bars project downwardly outwardly and rearwardly on an angle to each connect with the top of one of the runners R, by a pivotal attachment at $p^3$. As thus made and arranged when the draw-bar D, is pulled upon by means of its handle $d^2$, the runners are raised from off the ground to assume the position shown at Fig. 2. When the draw-bar is moved frontwardly the runners R, are forced downwardly so as to be below the lower edges of the vehicle wheels with the body resting upon the runners as shown at Fig. 1, and thus by the addition of my improved attachment to an ordinary baby-carriage the latter is adapted to be used as a sled or carriage accordingly as desired. By means of the holding pin P, on the clutch $C^3$, and the holes O, made in the draw-bar the runners when resting upon the ground or when raised from off of the latter are held in place.

I am aware that it is not new to pivotally connect sleigh runners with a baby-carriage, so that the runners may be caused to bear on the ground and to raise the wheels from off the latter, and which running when down may be raised so that the weight of the vehicle will rest on the wheels, and that my invention herein relates to an improved means of constructing the connecting parts by which the runners may be operated.

Having thus described my invention, what I claim, and desire to secure by Letters Patent, is—

1. The combination with the front and rear axle of a baby-carriage of two yokes, each of which at its upper end is hinged to one of the axles, of two runners, one of each of which is pivotally connected with the lower end of the arms of each of the said yokes, where on the same side of the vehicle; a draw-bar arranged on top of the rear axle and adapted to connect with the latter, the front end of said draw-bar being beneath the front axle; and links pivotally connected at each of their upper ends with said draw-bar, and at their lower end with one of each of said runners, substantially in the manner as and for the purposes set forth.

2. The combination with the axles $A'$, and $A^2$, of the yokes $N'$, and $N^2$, each having downcast arms and at their upper ends hinged to said axles substantially as described; the draw-bar D, having holding-pin passages O; the link-bars L, L, pivotally connecting at their upper ends with said draw-bar; the runners R, R, each made with the top rib $r^2$, and pivotally connected with the lower end of one of said link-bars; and the holding pin P, arranged on said rear axle, all constructed and arranged to operate substantially in the manner as and for the purposes set forth.

Signed at the city of Troy, New York, this 8th day of January, 1892, and in the presence of the two witnesses whose names are hereto written.

WILLIAM P. TARRANT.

Witnesses:
WILLIAM E. HAGAN,
H. B. BULLARD.